Figure 1:
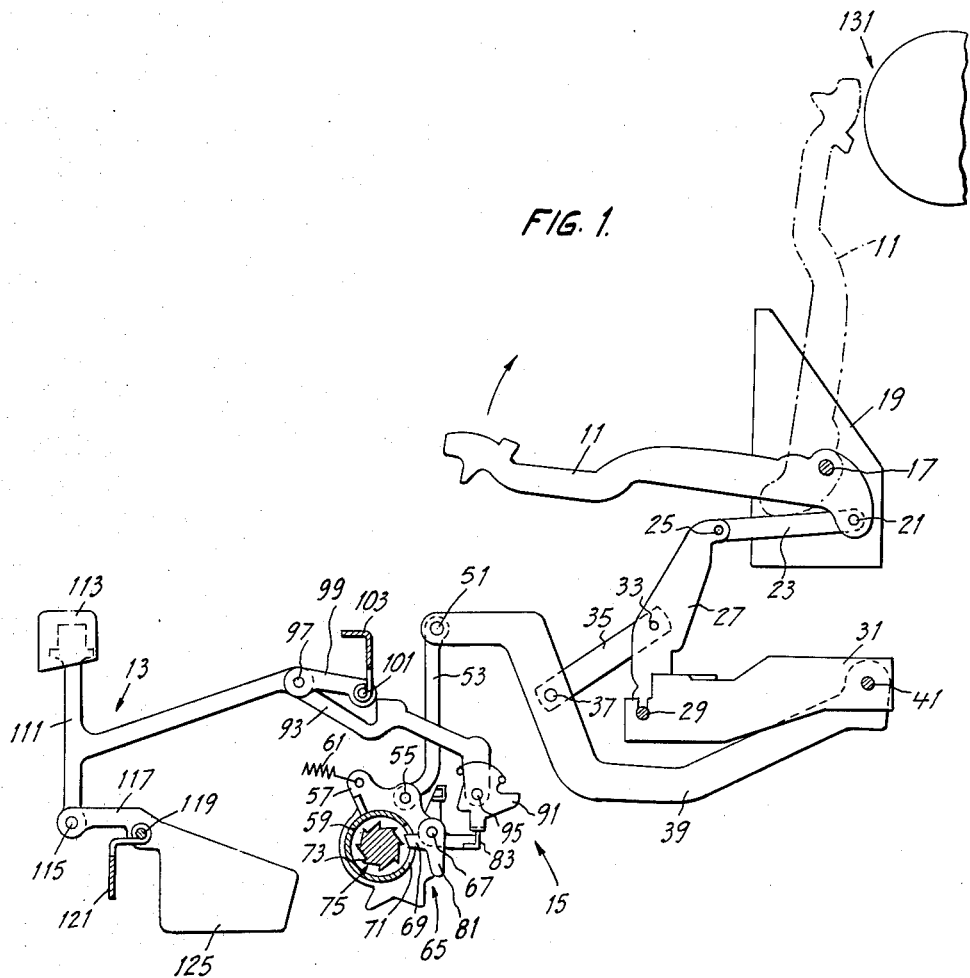

Nov. 2, 1965   J. C. MORRIS   3,215,247
COUNTERBALANCED LEVER SYSTEM FOR TYPEWRITERS
Filed May 31, 1963

INVENTOR.
JOHN C. MORRIS
BY
ATTORNEY

United States Patent Office 3,215,247
Patented Nov. 2, 1965

3,215,247
COUNTERBALANCED LEVER SYSTEM FOR TYPEWRITERS
John C. Morris, East Norwalk, Conn., assignor to Sperry Rand Corporation, New York, N.Y., a corporation of Delaware
Filed May 31, 1963, Ser. No. 284,528
3 Claims. (Cl. 197—17)

This invention relates to lever systems in business machines and more particularly to a lever system resistive to any induced force imparted to the elements of the system by acceleration of the system along a predetermined path.

The present invention finds ready application to power driven typewriters having lever systems utilizing a directed force to move an element or elements of the system in a predetermined path to effect operation of a device or mechanism.

Almost all work performing devices or equipment and especially those which are used for business, communications, measuring, testing, and the like incorporate a work effecting means in the form of a lever or a system of levers which are intentionally moved by a directed force, in a predetermined path, to effect operation of a work performing means also incorporated in the equipment. The lever or system of levers may be directly associated with a key or button which the equipment operator moves when using the equipment or it may be associated with other components of the equipment. Acceleration of the device or equipment along said predetermined path, either intentionally when the equipment is incorporated in a moving vehicle, or unintentionally when the equipment is accidentally displaced or dropped, will induce inertial forces in the elements of the lever system. If of sufficient magnitude the induced inertial forces will affect the elements of the lever system in the same manner as the directed force and thereby effect operation of the work performing means of the equipment. Such improper operation of the equipment may only result in an incorrect output therefrom or an output at an inopportune time. However, such improper operation often results in damage to the equipment.

The conventional power operated typewriter, which functions in a manner familiar to all, is but one example of a work performing device operated by a lever system. The typist applies a directed force to a selected key and thereby moves a key lever associated therewith through a predetermined distance in a predetermined path. The key lever is usually only one element of a multi-element, work effecting, lever system for effecting a coaction between a power mechanism and a work performing type bar power action to thereby drive a selected type bar from a rest position to a printing position. Should the typewriter frame be subjected to an impact, as it would be if dropped or if its support were struck a blow, all the work effecting elements thereof would be accelerated with respect to the typewriter frame due to inertial forces induced therein. Since all the elements of the work effecting lever system are interconnected the induced inertial force acting on any particular element of the system is in fact a resultant inertial force comprising the induced inertial force due to the mass of the particular element and those portions of the inertial forces induced in the other elements of the system which are transmitted to the particular element through its interconnection with the other elements of the system. If the resultant inertial forces acting on the work effecting key levers is of sufficient magnitude to move same through said predetermined distance in said predetermined path operation of the work performing type bar power actions for those key levers so moved will be initiated, and the corresponding type bars will be driven to printing position. Obviously since all the type bars cannot occupy the printing position at the same time the typewriter is subjected to considerable, if not irreparable, damage.

Many intricate systems have been designed to offset such inertial forces but said systems greatly complicate the manufacture and use of the equipment and raise the cost thereof. Other systems utilize dashpots or springs to resist such inertial forces but in doing so require a directed force of greater magnitude to effect operation of the equipment, thus either increasing the power requirements thereof or producing operator fatigue.

It is an object of this invention to provide a novel lever system.

Another object is to provide a novel lever system responsive to a directed force to effect operation of a device or mechanism.

Another object is to provide a novel lever system responsive to a directed force to effect operation of a device or mechanism and resistive to an induced inertial force tending to effect such operation of the device or mechanism.

Still another object is to provide a novel lever system simple in construction and inexpensive to manufacture.

Still another object is to provide a novel lever system for a lever operated mechanism such as a business machine or the like.

A still further object is to provide a novel lever system for a power operated business machine or the like.

A still further object is to provide a plurality of novel key actuated lever systems, in a business machine or the like, which are responsive to a directed force to effect operation of the business machine and which are resistive to a force induced therein by acceleration of the lever system, with respect to the frame of the machine, in a direction and of a magnitude sufficient to effect an improper operation of the business machine.

The present invention contemplates a work effecting lever system having an element or elements such as a type key lever or levers movable by a directed force normally applied by the operator and in a predetermined manner to effect operation of a work device or mechanism; and the association of a mass with said element or elements, positioned with respect thereto, such that inertial forces induced therein and tending to move same in said predetermined manner will act on both said element or elements, and said mass, to develop cancelling moments about a predetermined moment axis thereby offsetting any tendency of said work effecting lever or levers to effect an improper operation of the work device or mechanism.

Figure 2:
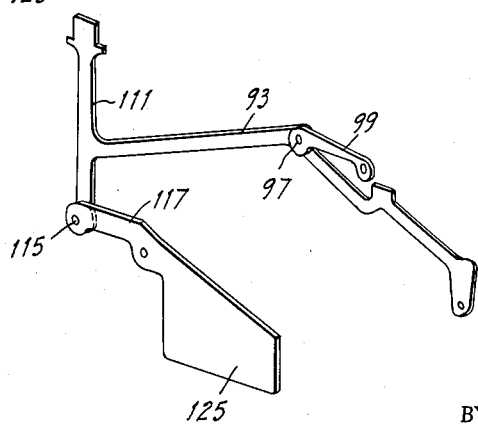

Other objects and advantages of the invention in its details of construction and arrangement of parts will be apparent from a consideration of the following specification and accompanying drawing wherein:

FIG. 1 is an elevational view of the power mechanism and one type bar of a business machine showing a key lever system therefor which embodies the present invention; and FIG. 2 is a perspective view of the key lever system of FIG. 1.

Referring to the drawing for a more detailed description of the present invention, an embodiment thereof is shown incorporated in a work effecting key lever system for a business machine such as a work device in the form of a typewriter or the like. It should be understood however, that the hereinafter described application of the invention to a business machine is for purposes of illustration only inasmuch as the subject invention finds ready application to any work device or mechanism in which a work effecting lever system is utilized.

FIGURE 1 shows a work performing means in the form of a single type bar 11, with a type key means comprising element or lever 13 for effecting operation of work performing type bar 11 through the action of a work effecting system primarily a power transmission train of links and levers (53, 39, 35, 27 and 23) generally designated by the numeral 15 (FIG. 1). In fact, most business machines require a number of sets of type bars 11, type keys or caps 113 on type key levers 13, and link and lever systems 15. Because each set of type bars 11, type keys levers 13, and link and lever systems 15 is substantially identical in configuration, the structure and operation of only one such set will be hereinafter described.

A pivot rod 17 (FIG. 1), carried by a conventional type segment 19, mounts type bar 11 for movement between a rest position (shown in full lines in FIG. 1) and a printing position (shown in broken lines in FIG. 1). A pivot pin 21 interconnects type bar 11 to a link 23 which is connected by a pivot pin 25 to a type bar bell-crank 27 mounted for movement about a rod 29 carried by a fulcrum bracket 31 supported between the side plates (not shown) of the business machine. A pivot pin 33 interconnects type bar bell-crank 27 to a link 35 which is connected by pivot pin 37 to a power ring bell-crank 39 mounted for pivotal movement about a rod 41 also carried by fulcrum bracket 31.

A pivot pin 51 interconnects power ring bell-crank 39 to one end of a power link 53 connected at its other end by a pin 55 to a single-action power interconnecting means including power ring 57, mounted for limited rotational movement on a tubular member 59 common to all the power rings and disposed between the side plates (not shown) of the business machine. A spring 61 (FIG. 1) is connected at one end to power ring 57 and at its other end (not shown) to the framework of the business machine to urge power ring 57 into its rest position as shown in FIG. 1.

A pawl 65 (FIG. 1), pivotally mounted on a pin 67 carried by power ring 57, is provided with an arm 69, disposed in a slot 71 formed in tubular member 59, and adapted for movement into the path of teeth 73 formed on a conventional power driven snatch roll 75. An arm 81 also formed on pawl 65, is engaged by a trigger 83 mounted for pivotal movement about pin 67.

A trip link 91, adapted for coaction with trigger 83, is mounted on a lever arm portion 93 (FIGS. 1 and 2) of type key 13 by a pivot pin 95. A pivot pin 97 interconnects lever arm portion 93 to a link 99 which is connected by a pivot rod 101 (FIG. 1) to a support bracket 103 mounted between the side plates (not shown) of the business machine.

A vertical leg portion 111 (FIGS. 1 and 2), of type key lever 13, carries at its upper extremity a key cap 113 and at its lower extremity a pivot pin 115. An arm 117, connected to vertical leg portion 111 by pin 115, is mounted on a pivot rod 119 (FIG. 1) carried by a bracket 121 supported between the side plates (not shown) of the business machine.

A mass 125 is formed on arm 117 of proper weight and dimensions as will be hereinafter described.

The operator, by applying a directed force to key cap 113, moves lever arm portion 93 and vertical leg portion 111, of type key lever 13, downwardly (FIG. 1) pivoting link 99 and arm 117 counterclockwise (FIG. 1) about their pivot rods 101 and 119 constituting a first pivot means and a second pivot means, respectively. Trip link 91 moving downwardly (FIG. 1) with lever arm 93 engages trigger 83 pivoting same clockwise (FIG. 1) about pivot pin 67 into engagement with arm 81 of pawl 65 to pivot pawl 65 clockwise (FIG. 1) about pivot pin 67. Arm 69 of pivoting pawl 65 moves into the path of rotation of a tooth 73 of power driven snatch roll 75 to be driven thereby, along with power ring 57, in a clockwise direction (FIG. 1) about tubular member 59. Link 53 connected to the moving power ring 57 by a pin 55 moves downwardly (FIG. 1) pivoting power ring bell-crank 39 counterclockwise (FIG. 1) about pivot rod 41. Link 35, moving with power ring bell-crank 39, pivots type bar bell-crank 27 counterclockwise (FIG. 1) about pivot rod 29 to move link 23 and pivot type bar 11 clockwise (FIG. 1) from its rest position to its printing position near a platen 131.

Continued rotation of power driven snatch roll 75 moves arm 69 of pawl 65 into engagement with the wall of slot 71 formed in tubular member 59. This action cams pawl 65 out of the path of rotation of teeth 73 of power driven snatch roll 75 permitting spring 61 to return power ring 57, power ring bell-crank 39, type bar bell-crank 27 and type bar 11 to their rest positions as shown in FIG. 1. A spring (not shown) returns type key lever 13 to its rest position, as shown in FIG. 1, upon removal of the operator's finger from key cap 113.

Such an upward spring bias, if of sufficient magnitude to resist the largest aforementioned inertial force likely to occur, would require that the typist press the keys with a disadvantageously high directed force.

During the aforementioned operation of the mechanism movement of arm 117 effects a concurrent counterclockwise pivoting movement (FIG. 1) of mass 125 about pivot rod 119 upon depression of type key lever 13, and a concurrent clockwise pivoting movement (FIG. 1) of mass 125 about pivot rod 119 upon release of type key lever 13. The presence of mass 125 is substantially imperceptible to the touch of the operator and in no way interferes with the normal operation of type keys 13.

Acceleration of the mechanism of FIG. 1, with respect to the supports mounting same, will induce inertial forces in each element thereof. The net induced inertial force acting on each element of the system is in fact an induced resultant force derived in part from the inertial effect upon the mass of the particular element and in part from the inertial effect upon the mass of the other elements of the system transmitted to the particular element by its interconnection therewith. Said induced resultant forces, like any other forces, have a magnitude and direction. In many instances the magnitude and direction of said induced resultant forces are of no significance. However should resultant forces be induced in type key lever 13 having magnitude and direction substantially equivalent to that of the directed force utilized to move same and thereby effect printing, there would be a tendency on the part of type key 13 to so move. Absent mass 125 said tendency would result in actual movement of each type key lever 13 so acted on and simultaneous movement of the corresponding type bars 11 to printing position resulting in considerable damage thereto since only one type bar can occupy the printing position at any designated time. However, the presence of mass 125 also has an effect on the induced resultant forces acting on each particular element of the system. The weight, location, and dimensions of mass 125 are such that when a resultant force is induced in type key lever 13 tending to move same in the manner required to effect printing a resultant force is also induced in mass 125 of opposite tendency. The type key lever 13 and mass 125 so acted on thus develop opposing and therefore cancelling moments which offset any tendency on the part of type key lever 13 to move independently of the aforementioned directed force normally applied, and thereby prevent improper printing. Since said induced resultant forces can be determined by proper calculation the moments thereof with respect to any desired moment axis can also be determined by proper calculation. The most convenient moment axis for determining said moments is of course an axis through said second pivot 119.

The aforementioned acceleration of the mechanisms of FIG. 1 may be generated in many ways but is usually generated by dropping the business machine. When movement of the frame of the falling business machine is arrested the mechanisms therein, being mounted for movement with respect to the frame, accelerate with respect thereto (or decelerate on rebound as the case may be) thus inducing inertial forces in the individual elements.

The configuration of lever arm portion 93 and vertical leg portion 111 of type key lever 13, the placement of pivot pins 97 and 115, the size and shape of links 99 and arms 117, and the location of pivot rods 101 and 119, enables type key lever 13 to move in a vertical direction in what is known as a parallel type key action. This type of key action and any other type of key action requiring only a light touch, is extremely susceptible to being improperly operated by an inertial force induced therein by acceleration of the mechanism if such acceleration is in the normal direction of key operation and if the inertial force induced thereby is of sufficient magnitude. However, the provision of a mass 125, as taught herein, of proper weight, dimension and location will prevent such improper operation.

Subject lever construction does not require either a parallel type action or an action responsive to a light touch. Any type of action is susceptible to improper operation if an inertial force is induced therein and any type of action may be provided with a lever system with a mass of proper weight, dimension and location, as taught herein, to offset the effect of induced inertial forces thereon. The type bar action described herein is therefore only exemplary. The present invention may be successfully applied to any action either power driven or manually operated. In fact, the teaching of the present invention may be successfully applied to any type of lever action whether required to effect operation of a business machine or whether required to effect operation of any other device or mechanism.

It is understood that although I have shown the preferred form of my invention, that various modifications may be made in the details thereof without departing from its spirit as comprehended by the following claims.

What is claimed is:

1. In a business machine such as a typewriter having a keyboard, the combination comprising
    (a) a work performing means movable between a rest position and a working position,
    (b) a key means including a key lever mounted for movement in response to a normally applied directed force acting in a predetermined direction to initiate operation of said work performing means, said key means being of the type movable in said direction by an inertial force inducible in said key means independently of said directed force to effect inadvertent movement of said working position,
    (c) means movable about a pivotal axis of said machine for mounting said key means including said lever for said movement,
    (d) a mass carried by said movable mounting means, and adapted to develop under said inertial force an inertial moment about said axis, said moment substantially cancelling the effect of said induced inertial force on said key means, thereby preventing said inadvertent movement, and
    (e) said means for mounting said key means comprising a first pivot means and a second pivot means, a first link and a second link making pivotal connection with said key lever and connecting said lever to said first pivot means and second pivot means respectively, each of said links extending from their respective pivot means to their respective pivotal connections with said key lever so as to constrain said key lever for movement substantially in said predetermined direction, at least one of said links further extending from said lever through its respective pivot means to terminate in an extended link portion including at least part of said mass.

2. In a business machine such as a typewriter having a keyboard, the combination comprising
    (a) a work performing means movable between a rest position and a working position,
    (b) a key means mounted for movement in response to a normally applied directed force acting in a predetermined direction to initiate operation of said work performing means, said key means being of the type movable in said direction by an inertial force inducible in said key means independently of said directed force to effect inadvertent movement to said working position,
    (c) means movable about a pivotal axis of said machine for mounting said key means for said movement,
    (d) a mass carried by said movable mounting means and adapted to develop under said inertial force an inertial moment about said axis, said moment cancelling the effect of said induced inertial force on said key means, thereby preventing said inadvertent movement, and
    (e) said means for mounting said key means comprising a first pivot means, a link making pivotal connection with said key means and connecting said key means to said first pivot means, a second pivot means through which said axis passes, and an arm making pivotal connection with said mass and key means and connecting said key means to said second pivot means, said link and said arm extending from their respective pivot means to their respective connections with said key means so as to constrain said key means for movement in substantially said direction, said arm further extending from said key means through said second pivot means to terminate in an extended portion including said mass.

3. In a business machine such as a typewriter having a keyboard, the combination comprising
    (a) a type bar movable between a rest position and a printing position,
    (b) power drive means for actuating said type bar from said rest position to said printing position,
    (c) a work effecting linkage and lever means operable by said drive means to move said bar to said printing position,
    (d) key means including a key lever mounted for movement in response to a normally applied directed force acting in a predetermined direction against a key return bias to initiate operation of said work effecting means, said key lever being of the type movable in said direction by an inertial force inducible in said key means independently of said directed force to effect inadvertent type bar movement to said printing position,
    (e) means movable about a pivotal axis of said machine for mounting said lever for said movement,
    (f) a mass carried by said movable mounting means and adapted to develop under said inertial force an inertial moment about said axis, said moment cancelling the effect of said induced inertial force on said key lever, thereby preventing said inadvertent movement, and
    (g) said means for mounting said key lever comprising a first pivot means and a second pivot means, a first link and a second link making pivotal connection with said key lever and connecting said lever to said first pivot means and second pivot means respectively, each of said links extending from their respective pivot means to their respective pivotal connections with said key lever by substantially equal lengths so as to constrain said key lever for movement in substantially said direction with parallel type key action, at least one of said links extending from said lever through its respective pivot means to terminate in an extended link portion including at least part of said mass.

(References on following page)

References Cited by the Examiner

UNITED STATES PATENTS

| | | | |
|---|---|---|---|
| 576,284 | 2/97 | Stickney | 197—33 X |
| 713,703 | 11/02 | Smith | 197—33 X |
| 717,144 | 12/02 | Uhlig | 197—22 |
| 1,602,758 | 10/26 | Dorsey | 197—17 |
| 2,005,185 | 6/35 | Garbell | 197—27 |
| 2,767,584 | 10/56 | Franzel et al. | 73—304 |
| 2,931,481 | 4/60 | Salto | 197—17 |
| 3,103,272 | 9/63 | Roggenstein | 197—17 |

WILLIAM B. PENN, *Primary Examiner.*

ROBERT E. PULFREY, *Examiner.*